(12) United States Patent
Hong

(10) Patent No.: US 9,948,764 B2
(45) Date of Patent: Apr. 17, 2018

(54) ARTIFICIAL INTELLIGENCE AUDIO APPARATUS AND OPERATION METHOD THEREOF

(71) Applicant: SAMSUNG ELECTRONICS CO., LTD., Suwon-si (KR)

(72) Inventor: Seung-se Hong, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 737 days.

(21) Appl. No.: 14/326,663

(22) Filed: Jul. 9, 2014

(65) Prior Publication Data

US 2015/0120618 A1 Apr. 30, 2015

(30) Foreign Application Priority Data

Oct. 25, 2013 (KR) ........................ 10-2013-0127712

(51) Int. Cl.
*G06F 17/00* (2006.01)
*G06F 17/20* (2006.01)
*H04M 1/725* (2006.01)
*G10L 13/04* (2013.01)
(Continued)

(52) U.S. Cl.
CPC ........ *H04M 1/72569* (2013.01); *G06Q 30/02* (2013.01); *G10L 13/04* (2013.01);
(Continued)

(58) Field of Classification Search
CPC ............ G06N 5/02; G06N 5/04; G06N 5/048; G06N 7/005
(Continued)

(56) References Cited

U.S. PATENT DOCUMENTS 8,327,455 B2 * 12/2012 Hong ...................... G06F 21/10
380/203
9,008,164 B2 * 4/2015 Hong ...................... H04L 27/01
375/219
(Continued)

OTHER PUBLICATIONS

A case study of machine learning hardware: Real-time source separation using Markov Random Fields via sampling-based inference Glenn G. Ko; Rob A. Rutenbar 2017 IEEE International Conference on Acoustics, Speech and Signal Processing (ICASSP) Year: 2017 pp. 2477-2481, DOI: 10.1109/ICASSP.2017.7952602 IEEE Conference Publications.*
(Continued)

*Primary Examiner* — Michael B Holmes
(74) *Attorney, Agent, or Firm* — Sughrue Mion, PLLC

(57) ABSTRACT

An artificial intelligence audio apparatus includes a sensing part which is configured to sense a current location and a temperature and/or a humidity thereof and sense whether a human exists in the current location; and a controller which is configured to receive weather information of the current location from an external server using location information of the current location, determine whether a predetermined greeting should be output when the human exists in the current location, and in response to determining that the predetermined greeting should be output, extract at least one of a greeting voice and a greeting text, from greeting data stored in a storage, which corresponds with a current time, at least one of the temperature and the humidity, and the weather information of the current location, and output the extracted at least one of the greeting voice and the greeting text.

28 Claims, 4 Drawing Sheets

(51) Int. Cl.
G06Q 30/02 (2012.01)
G06F 3/16 (2006.01)

(52) U.S. Cl.
CPC ......... G06F 3/167 (2013.01); H04M 1/72566 (2013.01); H04M 1/72572 (2013.01)

(58) Field of Classification Search
USPC .......................................................... 706/11
See application file for complete search history.

(56) References Cited

U.S. PATENT DOCUMENTS

| | | | | |
|---|---|---|---|---|
| D769,846 S | * | 10/2016 | Hong | D14/216 |
| 2004/0008584 A1 | | 1/2004 | Park | |
| 2007/0192787 A1 | * | 8/2007 | Hong | G06F 21/10 725/25 |
| 2011/0178947 A1 | | 7/2011 | McNutt et al. | |
| 2013/0073094 A1 | * | 3/2013 | Knapton | F24F 11/0034 700/278 |
| 2013/0295839 A1 | * | 11/2013 | Bourakov | H04H 20/61 455/3.01 |
| 2014/0016684 A1 | * | 1/2014 | Hong | H04L 27/01 375/224 |
| 2014/0219483 A1 | * | 8/2014 | Hong | H04R 5/02 381/307 |
| 2014/0357226 A1 | * | 12/2014 | Charugundla | H04W 4/023 455/411 |
| 2015/0120618 A1 | * | 4/2015 | Hong | G10L 13/04 706/11 |

OTHER PUBLICATIONS

Machine learning via multimodal signal processing K. Kokkinidis; A. Stergiaki; A. Tsagaris 2017 6th International Conference on Modern Circuits and Systems Technologies (MOCAST) Year: 2017 pp. 1-4, DOI: 10.1109/MOCAST.2017.7937653 IEEE Conference Publications.*

Competence-Based Song Recommendation: Matching Songs to One's Singing Skill Kuang Mao; Lidan Shou; Ju Fan; Gang Chen; Mohan S. Kankanhalli IEEE Transactions on Multimedia Year: 2015, vol. 17, Issue: 3 pp. 396-408, DOI: 10.1109/TMM.2015.2392562 IEEE Journals & Magazines.*

Interference Reduction in Reverberant Speech Separation With Visual Voice Activity Detection Qingju Liu; Andrew J. Aubrey; Wenwu Wang IEEE Transactions on Multimedia Year: 2014, vol. 16, Issue: 6 pp. 1610-1623, DOI: 10.1109/TMM.2014.2322824 IEEE Journals & Magazines.*

A Music Information Retrieval Approach Based on Power Laws Patrick Roos; Bill Manaris 19th IEEE International Conference on Tools with Artificial Intelligence(ICTAI 2007) Year: 2007, vol. 2 pp. 27-31 IEEE Conference Publications.*

Applying audio description for context understanding of surveillance videos by people with visual impairments Virginia Pinto Campos; Luiz Marcos G. Goncalves; Tiago Maritan U. de Araujo 2017 14th IEEE International Conference on Advanced Video and Signal Based Surveillance (AVSS) Year: 2017 pp. 1-5 IEEE Conference Publication.*

A Novel Methodology to Label Urban Remote Sensing Images Based on Location-Based Social Media Photos Mingmin Chi; Zhongyi Sun; Yiqing Qin; Jinsheng Shen; Jón Atli Benediktsson Proceedings of the IEEE Year: 2017, Volume: 105, Issue: 10 pp. 1926-1936 IEEE Journals & Magazines.*

Crowd-ML: A library for privacy-preserving machine learning on smart devices Jihun Hamm; Jackson Luken; Yani Xie 2017 IEEE International Conference on Acoustics, Speech and Signal Processing (ICASSP) Year: 2017 pp. 6394-6398 IEEE Conference Publications.*

* cited by examiner

FIG. 2

| NAME | DATE OF MODIFICATION | TYPE | SIZE | TIME | WEATHER | MOOD |
|---|---|---|---|---|---|---|
| Chopin Berceuse In D Flat Op_Dang Thai Son_70 Game Of Pinao.flac | 2013-07-15 AFTERNOON | FLAC-File | 10,429KB | MORNING | CLEAR | LIGHT |
| Niccolo Paganini La campanella_Various Artists_OUR KID'S HAPPINESS.flac | 2013-07-15 AFTERNOON | FLAC-File | 21,763KB | EVENING | CLOUDY | DARK |
| Rolling In The Deep_Adele_21.flac | 2013-07-15 AFTERNOON | FLAC-File | 29,414KB | AFTERNOON | CLEAR | LIGHT |
| CAFÉ IN THAT WINTER_YONG PIL CHO_REMINISCENT AND ROMANTIC FOLK SONG.flac | 2013-07-16 AFTERNOON | FLAC-File | 21,800KB | EVENING | CLOUDY | DARK |
| BRAND_JAE BOM LIM_THE SLAVE HUNTERS (KBS DRAMA).flac | 2013-07-16 AFTERNOON | FLAC-File | 36,544KB | EVENING | CLOUDY | LIGHT |
| WHO'S CRYING?_HO BAE_IMMORTAL SINGER HO BAE SUPER GOLDEN (43 SONGS COMMEMORATING HO BAE).flac | 2013-07-15 AFTERNOON | FLAC-File | 10,275KB | AFTERNOON | CLOUDY | DARK |
| GIRL IN THE TOBACCO STORE (ORIGINAL SINGER CHANG SIK SONG)JJK DONG WOOK KIM_I AM SINGER JUNE 24.flac | 2013-07-16 AFTERNOON | FLAC-File | 39,298KB | AFTERNOON | CLEAR | LIGHT |
| WINDY LOVE_MYUNG JIN MOON_THE SEA GOD (KBS DRAMA).flac | 2013-07-15 AFTERNOON | FLAC-File | 29,022KB | AFTERNOON | CLOUDY | DARK |
| BACH, ARIA IN G_SUNG EUN CHOI_CLASSIC.flac | 2013-07-15 AFTERNOON | FLAC-File | 12,833KB | MORNING | CLEAR | DARK |
| 500 Miles_Peter, Pail & Mary_The Very Best Of Peter, Paul And Mary.mp3 | 2013-07-15 MORNING | MPEG Layer3 | 32,871KB | EVENING | CLOUDY | DARK |
| I Dreamed A Dream_Susan Boyle_I Dreamed A Dream.mp3 | 2013-07-16 MORNING | MPEG Layer3 | 7,649KB | EVENING | CLEAR | LIGHT |

ARTIFICIAL INTELLIGENCE AUDIO APPARATUS AND OPERATION METHOD THEREOF

CROSS-REFERENCE TO RELATED APPLICATION

This application claims priority from Korean Patent Application No. 10-2013-0127712, filed on Oct. 25, 2013 in the Korean Intellectual Property Office, the disclosure of which is incorporated herein by reference.

BACKGROUND

Field

Apparatuses and methods consistent with the exemplary embodiments relate to an artificial intelligence audio apparatus which is capable of interacting with a human. In particular, exemplary embodiments relate to an artificial intelligence audio apparatus and an operation method thereof which determines an existence of a human and says a greeting that is suitable for a current time and surrounding environment, asks the human whether to play music, and upon request, selects and plays music that is suitable for the surrounding environment and mood. Further, when certain music is played, adjusts a lighting suitable for a type of the played music to create a mood.

Description of the Related Art

In a related art, an audio apparatus such as an audio player is used to play and listen to music widely used by people to get rid of stress who are more engaged in mental labor than in manual labor.

The audio apparatus of the related art passively plays music selected by a user according to a user command. Accordingly, a user selects music to listen to such music. Further, a user may not share a same feeling with the audio apparatus such as an emotional feeling that otherwise may occur from an interaction with other people. Accordingly, a user recognizes the audio apparatus simply as a device for playing music, and may not have an emotional connection which may otherwise occur from an interaction with people. In fact, the audio apparatus is primarily used for getting rid of stress through listening to music.

Accordingly, there is a need for an artificial intelligence audio apparatus which may comprehensively determine circumstances of a user, say greetings to a user, and at the same time provide music or mood more actively or intelligently to a user, beyond a passive playing of music according to a user command.

SUMMARY

Accordingly, the exemplary embodiments may provide an artificial intelligence audio apparatus and an operation method thereof which is capable of determining an existence of a human and saying a greeting that is suitable for a current time and surrounding environment.

Another exemplary embodiment may provide an artificial intelligence audio apparatus and an operation method thereof which is capable of asking a user whether to play music and upon request, selecting and playing music that is suitable for a current time, surrounding environment, and mood.

Still another exemplary embodiment may provide an artificial intelligence audio apparatus and an operation method thereof which is capable of adjusting a lighting and creating a mood that is suitable for a certain music when the certain music is played.

An aspect of exemplary embodiments may provide an artificial intelligence audio apparatus including: a sensing part which is configured to sense a current location of the artificial intelligence audio apparatus and at least one of a temperature and a humidity of the current location, and sense whether a human exists in the current location; a first communicator which is configured to communicate with an external server through a network; a storage which is configured to store greeting data which includes at least one of a plurality of greeting voices and a plurality of greeting texts according to a plurality of circumstances, and music data which includes a plurality of music; a voice processor which is configured to process and output a voice and music; a display processor which is configured to process and output a text; and a controller which is configured to receive weather information of the current location from the external server using location information of the current location sensed by the sensing part, determine whether a predetermined greeting should be output when the sensing part senses an existence of the human in the current location, and in response to determining that the predetermined greeting should be output, extracts at least one of a greeting voice and a greeting text, from greeting data stored in the storage, which corresponds with a current time, at least one of the temperature and the humidity sensed by the sensing part, and the weather information of the current location received from the external server, and output the extracted at least one of the greeting voice and the greeting text through at least one of the voice processor and the display processor.

The sensing part may include a location sensor which is configured to sense the current location, a temperature and humidity sensor which is configured to sense the temperature and the humidity and a human body detection sensor which is configured to sense whether the human exists in the current location. Here, the location sensor may include a global positioning system (GPS) module. Also, the human body detection sensor may include at least one of a passive infrared (PIR) sensor which is configured to sense infrared rays, and a camera which is configured to photograph an image.

The external server may include a weather information server which is configured to provide the weather information which includes the date and the current time.

The storage may be further configured to store guiding data which includes a guiding voice and a guiding text for inquiring whether to play music. In this case, the controller may be further configured to extract at least one of the guiding voice and the guiding text from the guiding data stored in the storage, and output the extracted at least one of the guiding voice and the guiding text through the at least one of the voice processor and the display processor, and in response to a request for playing music, selecting a music from the music data stored in the storage which corresponds with the current time, the illumination sensed by the sensing part and the weather information received from the external server, and output the music through the voice processor. At this time, the music data may be stored in the storage and classified into folders according to time, weather, and the illumination. Alternatively, the music data may be stored in the storage and classified with tag information according to time, weather and the illumination.

In addition, the artificial intelligence audio apparatus may further include an image processor which is configured to process an image and output the processed image to an external display apparatus. In this case, the controller may be further configured to output through the image processor a greeting image, a guiding image and a video corresponding to the greeting voice or the greeting text, the guiding voice or the guiding text and the music, respectively, in an output thereof.

A timing for outputting the predetermined greeting may include a timing when the artificial intelligence audio apparatus is turned on and a plurality of timings which occur whenever a certain time elapses after the artificial intelligence audio apparatus is turned on.

Also, the artificial intelligence audio apparatus may further include a second communicator which is configured to wirelessly communicate with an illumination controller that controls an internal illumination. Here, the controller may be further configured to transmit an illumination control scenario, which corresponds to music that is output through the voice processor, to the illumination controller through the second communicator to control the internal illumination according to the illumination control scenario in response to selecting and listening to the music.

Another aspect of exemplary embodiments may provide an operation method of an artificial intelligence audio apparatus, the operation method including: sensing a current location of the artificial intelligence audio apparatus and at least one of a temperature and a humidity of the current location; receiving weather information through a network using location information of the sensed current location; sensing whether a human exists in the current location; determining whether it is time to output a predetermined greeting in response to the human being sensed in the current location; and extracting and outputting a greeting voice or a greeting text, from prestored greeting data, which corresponds with a current time, at least one of the sensed temperature and the sensed humidity, and the weather information received through the network, in response to determining that it is the time to output the predetermined greeting.

The receiving the weather information may include receiving the date and the current time.

The sensing whether the human exits may include sensing whether the human exits for every predetermined first time.

The determining whether it is time to output the predetermined greeting may include determining when the artificial intelligence audio apparatus is turned on and determining when a plurality of timings at a predetermined second time elapses after the artificial intelligence audio apparatus is turned on.

The sensing the temperature and the humidity of the current location further may include sensing an illumination of the current location, and the outputting may further include: extracting and outputting at least one of a guiding voice and a guiding text from prestored guiding data; and selecting and outputting music from prestored music data which corresponds with the current time, the sensed illumination, and the weather information received through the network in response to a request to play the music.

At this time, the music data may be stored and classified into folders according to time, weather, and the illumination. Alternatively, the music data may be stored with tag information according to time, weather, and the illumination.

In addition, the outputting may further include further outputting a greeting image, a guiding image and a video corresponding to the greeting voice or the greeting text, the guiding voice or the guiding text and the music, respectively, in an output thereof.

Alternatively, the operation method may further include controlling an internal illumination according to an illumination control scenario which corresponds to an output music in response to a user selecting and listening to the music.

Another aspect of exemplary embodiments may provide a controller for controlling operations of an artificial intelligence audio apparatus including: a first control block which is configured to determine whether a human exits in a current location of the artificial intelligence audio apparatus and output a greeting which corresponds with the current time and the current location of the artificial intelligence audio apparatus; a second control block which is configured to inquire whether to play music corresponding to the current location, and select and play the music corresponding to the current location in response to a request to play music corresponding to the current location being input; and a third control block which is configured to adjust an illumination corresponding to the music played.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 2 illustrates an example of storing music data by the artificial intelligence audio apparatus according to the embodiment;

DETAILED DESCRIPTION OF THE EXEMPLARY EMBODIMENTS

Figure 1:
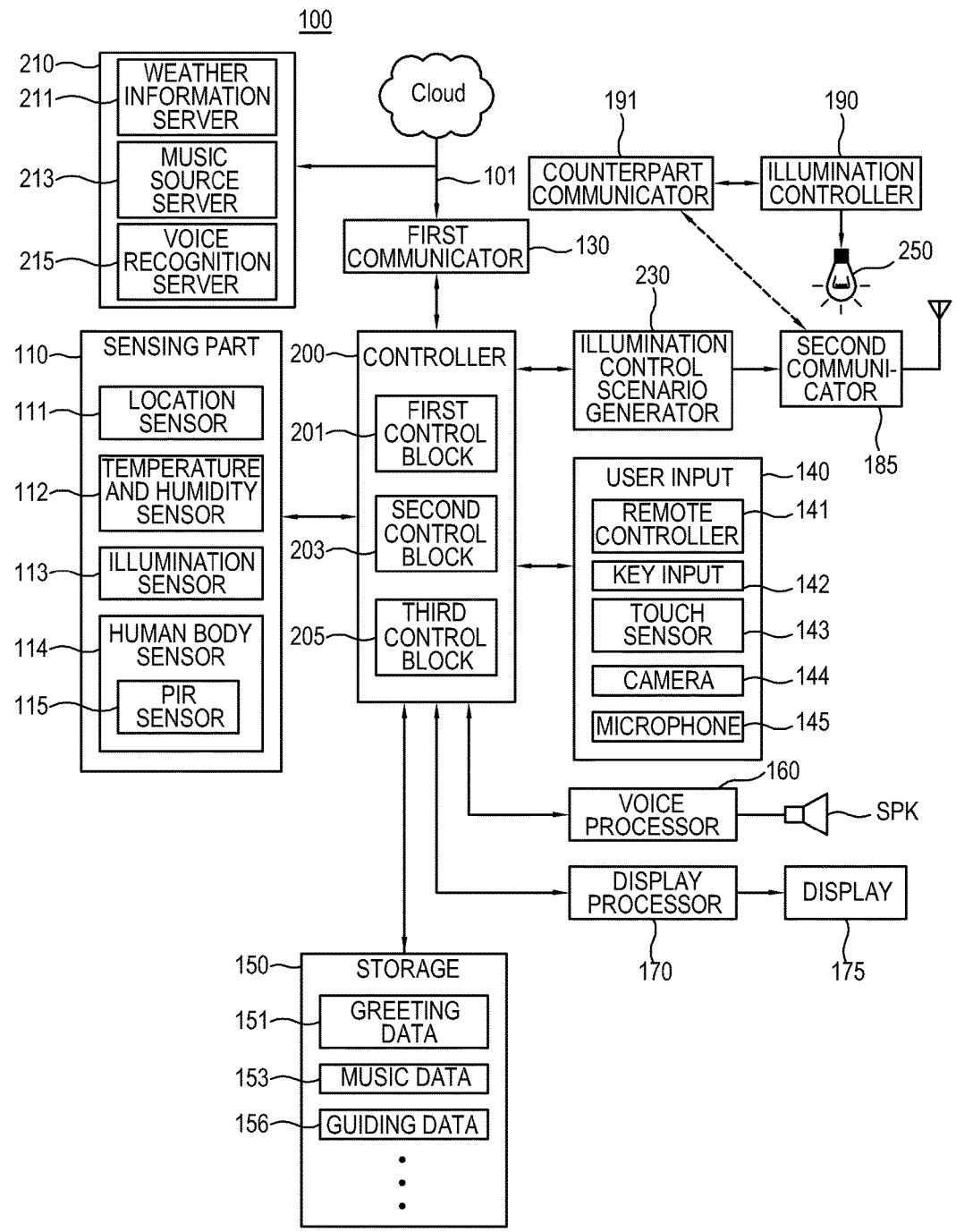
FIG. 1 is a block diagram of an artificial intelligence audio apparatus according to an embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Hereinafter, an artificial intelligence audio apparatus and an operation method thereof according to embodiments will be described in more detail with reference to accompanying drawings.

FIG. 1 is a block diagram of an artificial intelligence audio apparatus 100 according to an embodiment.

The artificial intelligence audio apparatus 100 according to the embodiment is an intelligent device which may interact with a human, and includes a device such as a home audio system, a car audio apparatus, and a mobile audio apparatus which may access the Internet and play music. Hereinafter, a mobile audio apparatus which may access the Internet will be explained as an example of the artificial intelligence audio apparatus 100.

As shown in FIG. 1, the artificial intelligence audio apparatus 100 according to the embodiment includes a sensing part 110, a first communicator 130, a user input 140, a storage 150, a voice processor 160, a display processor 170, a second communicator 180, and a controller 200.

The sensing part 110 obtains environmental information of a place where the artificial intelligence audio apparatus 100 is currently located (hereinafter, "current location"), and provides the environmental information to the controller 200. The sensing part 110 includes a location sensor 111, an illumination sensor 112, a temperature and humidity sensor 113, and a human body detection sensor 114.

The location sensor 111 senses and provides the current location and current time to the controller 200. Based on the location and current time information that has been sensed by the location sensor 111, the controller 200 collects weather information of the current location from an external server 210, e.g., from a weather information server 211 through the first communicator 130. The controller 200 stores in the storage 150 the sensed location and current time information and the collected weather information of the current location.

The location sensor 111 may be implemented as a global positioning system (GPS) module to receive current location and current time information from a satellite.

The temperature and humidity sensor 112 senses and provides an internal temperature and humidity of the current location to the controller 200. As will be described later, based on temperature and humidity information that has been sensed by the thermometer 112, together with the current time information sensed by the location sensor 111 and the weather information of the current location collected by the weather information server 211, the controller 200 extracts a greeting voice and/or greeting text that are suitable for the current time and surrounding environment of the current location from greeting data 151 stored in the storage 150, and outputs the extracted greeting voice and/or greeting text to the voice processor 160 and/or display processor 170. The controller 200 stores the sensed temperature and humidity information in the storage 150.

The illumination sensor 113 senses and provides an internal illumination of the current location to the controller 200. As will be described later, based on an illumination signal that has been sensed by the illumination sensor 113 together with the current time information sensed by the location sensor 111 and the weather information of the current location collected by the weather information server 211, the controller 200 selects a music that is suitable for the current time and the surrounding environment and mood of the current location from music data 153 stored in the storage 150, and outputs the music to the voice processor 160. The controller 200 stores the sensed illumination information in the storage 150.

The human body detection sensor 114 senses an existence or non-existence of a human in the current location every predetermined first time, e.g., every three minutes by a control of the controller 200. If the human body detection sensor 114 senses that there is a human in the current location, the controller 200 determines whether to it is time to output a predetermined greeting, and if so, extracts a greeting. The timing for outputting the predetermined greeting may include a timing when the artificial intelligence audio apparatus 100 is turned on, and respective timings whenever a predetermined second time, e.g., three hours elapse after the artificial intelligence audio apparatus 100 is turned on. If it is sensed that there is no human in the current location, the controller 200 further performs the operation of sensing the existence or non-existence of a human in the current location for every first time and for a predetermined frequency, e.g., three times, and if it is sensed that that is still no human after the further performance of three times, turns off the artificial intelligence audio apparatus 100. The artificial intelligence audio apparatus 100 may be turned off by gradually decreasing a volume of a music output by a speaker through the voice processor 160 and by fading out an image output by the display unit 175 through the display processor 170.

The human body detection sensor 114 may be implemented as a passive infrared (PIR) sensor 115 to sense an infrared of a human.

The human body detection sensor 115 may also be implemented as a camera 144 of the user input 140. The camera 144 includes a camera module, and photographs an image by converting an optical signal into a video signal. The camera module processes an image frame such as a still image or video that is obtained by an image sensor and transmits the processed image frame to the controller 200. The controller 200 may determine an existence or non-existence of a human by a known method such as comparing the transmitted image frame with a basis image that is stored in advance in the storage 150 for sensing an existence of a human, e.g., a background screen, extracting a different part therefrom, and comparing the different part with a stored figure image.

In addition to sensing the existence or non-existence of a human, the camera 144 concurrently performs functions of the user input 140 for sensing a user motion gesture.

In addition to the aforementioned sensors, the sensing part 110 may further include a gyro sensor (not shown) to sense a rotation of the artificial intelligence audio apparatus 100, and a shock sensor (not shown) to sense a shock of the artificial intelligence audio apparatus 100.

The first communicator 130 communicates with the external server 210, e.g., with the weather information server 211 providing weather information of a current location that is sensed by the location sensor 111, through a network 101 by a control of the controller 200. The first communicator 130 is implemented as a wired/wireless communication module to be connected to the network 101, and transmits location information of the current location to the weather information server 211 by a control of the controller 200. Based on the location information of the current location that is transmitted by the controller 200 through the first communicator 130, the weather information server 211 generates weather information of the current location and transmits the weather information to the controller 200 through the first communicator 130. The weather information may include weather information including the date and time. By using the received weather information together with the current time information sensed by the location sensor 111, the temperature and humidity information sensed by the temperature and humidity sensor 112, and/or the illumination signal sensed by the illumination sensor 113, the controller 200 extracts a greeting and music suitable for a surrounding environment and mood of the current location from the greeting data 151 and music data 153 stored in the storage 150.

The external server 210 may include a big data server such as a music source server 213 to provide music data, and a voice recognition server 215 to provide voice recognition service, in addition to the weather information server 211. Upon request from the controller 200 through the network 101, the music source server 213 extracts and transmits a requested music to the controller 200. Upon request for voice recognition service from the controller 200 through the network 101, the voice recognition server 215 performs a voice recognition with respect to a voice signal transmitted by the controller 200, based on voice recognition rules of an internal recognition regulation database and extracts a character from the voice signal and transmits recognition information including the extracted character to the controller 200.

The user input 140 receives a user command. The user command includes information which is used to decide a performance of a predetermined operation by the artificial intelligence audio apparatus 100 by a user activity, etc. The predetermined operation may include an operation of controlling basic functions of the artificial intelligence audio apparatus 100 such as turning on and off and adjustment of a volume, and an operation of inputting various execution commands and settings necessary for executing firmware or an operating system (OS) stored in the storage 200 or an application specific integrated circuit (ASIC) part. The user command may include a remote control signal that is input through a manipulation of the remote controller 141, a key input signal that is input through the key input 142, a touch input signal that is input through a touch of the touch sensor 143, a gesture command signal that is input through the camera 144, and/or a voice command signal that is input through the microphone 145.

The remote controller 141 includes a remote controller (not shown) that has input keys or buttons. A remote control signal receiver (not shown) receives a remote control signal including key input information corresponding to a user input from the remote controller, and transmits the remote control signal to the controller 200. The controller 200 controls a corresponding function and/or elements in response to the remote control signal.

The key input 142 includes input keys or buttons that are formed in a front lower part or lateral part of a case (not shown) of the artificial intelligence audio apparatus 100. The key input 142 generates a key signal related to controlling a function of the artificial intelligence audio apparatus 100 according to a user input that is given through the input key or button, and transmits the key signal to the controller 200. The key signal includes a power on/off signal, a volume adjustment signal, etc. The controller 200 controls a corresponding function and/or elements in response to a key signal that is input through the key input 142.

The touch sensor 143 is installed in a front surface of the display unit 175, and generates a touch input signal corresponding to a user manipulation that is made through a touch input device such as a pen or a user finger, and transmits the touch input signal to the controller 200. The controller 200 controls a corresponding function and/or elements in response to the touch input signal. The touch sensor 143 may be implemented as a resistive type, a capacitive type, or a pressure type.

As explained above, the camera 144 includes a camera module that processes an image frame such as a still image or video obtained by an image sensor and transmits the image frame to the controller 200. The controller 200 compares the transmitted image frame with motion gesture image information that is stored in advance in the storage 150, and if there is a gesture image that is equal to the transmitted image frame, determines that the motion gesture command signal has been input, and controls a corresponding function and/or elements. The camera 144 may also perform the function of sensing the existence or non-existence of a human by the human body detection sensor 114 of the sensing part 110.

The microphone 145 includes a microphone to convert a voice into an electrical signal. The microphone converts a user voice into an electrical signal and transmits the electrical signal to the controller 200. The controller 200 compares the voice signal transmitted by the microphone, with voice command information stored in the storage 150. If there is a voice command that is equal to the transmitted voice signal, the controller 200 determines that the voice command signal has been input, and controls a corresponding function and/or elements. If a voice recognition function has been selected through the remote controller 141 or the touch sensor 143, the controller 200 transmits the voice signal provided by the microphone, to the voice recognition server 215 together with a request for a voice recognition service, and receives recognition information including a character that is included in an extracted voice signal through the voice recognition server 215, and controls the display processor 170 to display the character included in the received recognition information through the display unit 175.

The storage 150 stores therein firmware or an operating system (OS) as a control program necessary to drive the artificial intelligence audio apparatus 100.

The storage 150 stores therein greeting data 151 including a plurality of greeting voices and/or a plurality of greeting texts according to circumstances, and music data 153 including a plurality of music.

The greeting data 151 are used to extract a greeting that is suitable for the current time and surrounding environment of the current location, based on the current time sensed by the location sensor 111, the weather information collected from the weather information server 211 and the temperature and humidity information sensed by the temperature and humidity sensor 112.

As shown in Table 1 below, various greeting voices and greeting texts of the greeting data 151 may be set and stored corresponding to the current time and surrounding environment of the current location, i.e., corresponding to weather and temperature/humidity.

TABLE 1

Example of greeting voices and greeting texts

| Category | Description |
| --- | --- |
| Prior words | Good morning (afternoon or evening).<br>A fine spring rain falls this morning (afternoon or evening).<br>It's cold this morning (afternoon or evening) due to the last cold snap.<br>Merry Christmas! Good morning (afternoon or evening).<br>. <br>. <br>. |
| Main sentence | The weather in [name of territory] on [date] is clear (cloudy) and current temperature is xx° C., humidity xx% and internal temperature xx° C.<br>. <br>. <br>. |
| Ending word | Good luck today.<br>Have a nice day.<br>. <br>. <br>. |

As explained above, the music data 153 are used to extract a music that is suitable for the current time and mood of the current location, based on the current time sensed by the location sensor 111, the weather information collected from the weather information server 211, and illumination information sensed by the illumination sensor 113.

As in Table 2 below, the music data 153 may be classified into folders and stored in the storage 200 according to a current time (e.g., morning from 5 a.m. to 10 a.m., afternoon from 10 a.m. to 6 p.m., and evening from 6 p.m. to 5 a.m.), weather (e.g., clear, cloudy), and mood (e.g., illumination) of the current location. The mood may be decided depending on the illumination. For example, if an illumination is high, the mood may be classified as light or lightness. If an illumination is low, the mood may be classified as dark.

TABLE 2

Example of Stored Music Data

| Folder Name | Type of Music |
|---|---|
| Morning_Clear Weather_Light Mood | Vivid music |
| Morning_Cloudy Weather_Dark Mood | Dance music Dynamic music with quick beat |
| Afternoon_Clear Weather_Light Mood | Calm music (ballad, etc.) |
| Afternoon_Cloudy Weather_Light Mood | Sweet music (Rock ballad, R&B, etc.) |
| . | . |
| . | . |
| . | . |

Otherwise, as shown in FIG. 2, the music data 153 may be stored by having tag information 155 according to the current time (e.g., morning from 5 a.m. to 10 a.m., afternoon from 10 a.m. to 6 p.m., and evening from 6 p.m. to 5 a.m.), weather (clear, cloudy), and mood (e.g., illumination) of the current location.

The classification and storage of the music data 153 may be performed through a setting picture or window (not shown) that is executed and displayed by the ASIC part after a user listens to music.

The storage 150 may further store therein guiding data 156 including a guiding voice and guiding text asking a user whether to play music.

The guiding voice and/or guiding text is output through a speaker and/or the display unit 175 after the greeting voice and/or greeting text is given to a user by a control of the controller 200.

The guiding voice and/or guiding text may include, e.g., "Would you like to play music?"

The storage 150 may store therein motion gesture image information corresponding to a plurality of motion gesture commands and voice command information corresponding to a plurality of voice commands to control operations of the artificial intelligence audio apparatus 100. The motion gesture image information and voice command information are used to recognize a motion gesture command and voice command by being compared with a motion gesture command and voice command that are input by a user through the camera 144 and microphone 145, respectively.

The storage 150 may store therein various information and/or contents collected from the external server 210 such as the weather information server 211, the music server 213, and the like through the network 101 by the controller 200 according to a user input given through the user input 140, time and location information, temperature and humidity information, and illumination information sensed by the sensing part 110.

The storage 150 may be implemented as a storage medium including at least one of a flash memory type, a hard disc type, a multimedia card micro type, a card-type memory (e.g., SD or XD memory), random access memory (RAM), static random access memory (SRAM), a read only memory (ROM), electrically erasable programmable read only memory (EEPROM), programmable read only memory (PROM), magnetic memory, magnetic disc, and optical disc.

The voice processor 160 processes a greeting voice of the greeting data 151 and music of the music data 153 stored in the storage 150, and outputs the processed greeting voice and music to the speaker by a control of the controller 200. The voice processor 160 may be implemented as an audio amplifier.

The display processor 170 processes a graphic image and/or message showing an operation of the artificial intelligence audio apparatus 100 stored in the storage 150, and outputs the processed graphic image and/or message to the display unit 175 by a control of the controller 200.

The display processor 170 processes a greeting text of the greeting data 151 and a guiding text of the guiding data 156 stored in the storage 150, and outputs the greeting text and guiding text to the display unit 175 by a control of the controller 200.

The display unit 175 displays therein the graphic image and text that have been processed by the display processor 170. The display unit 175 may be implemented as a liquid crystal display (LCD) or vacuum fluorescent display (VFD).

Figure 3:
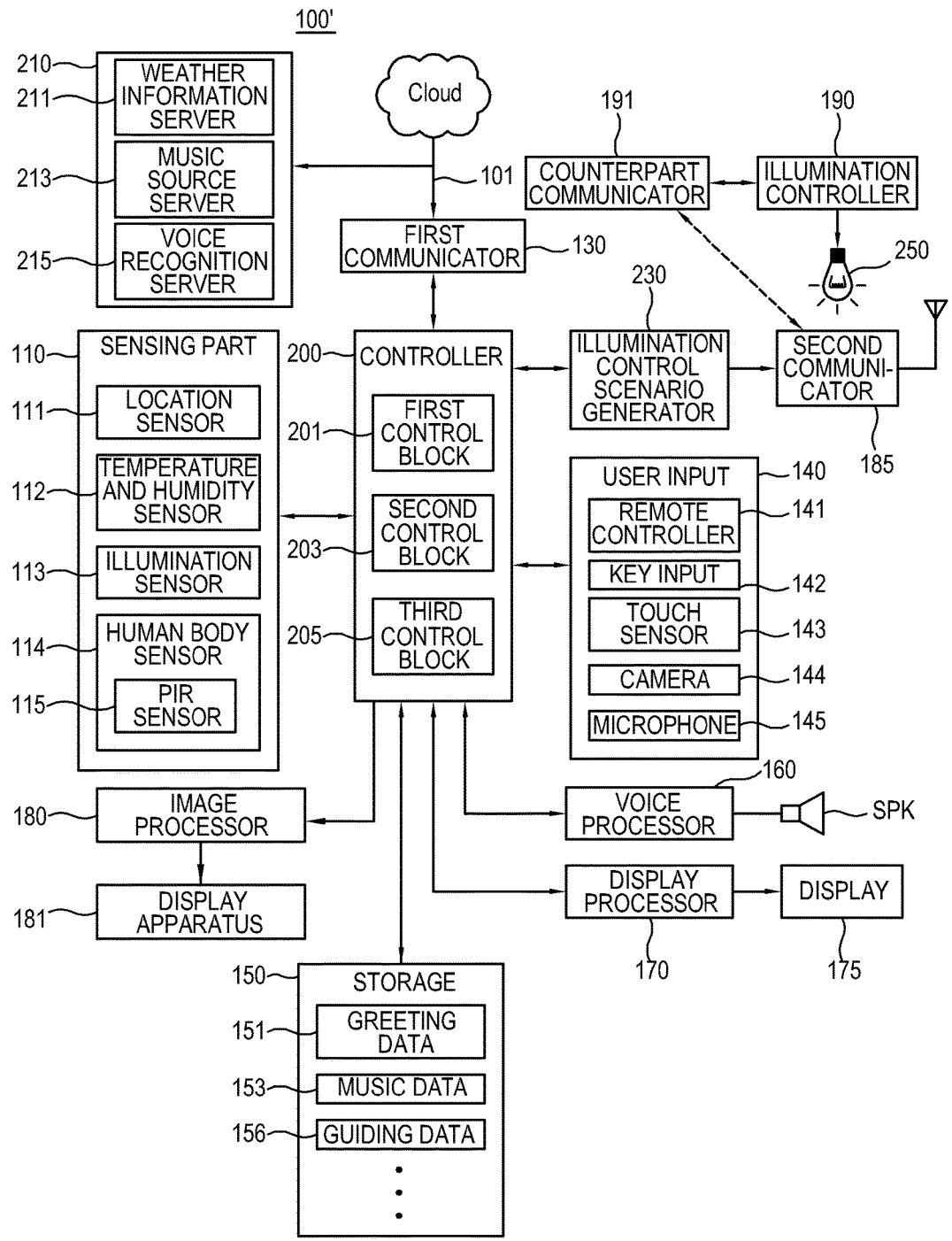
FIG. 3 is a block diagram of an artificial intelligence audio apparatus according to another embodiment.

In another exemplary embodiment, as shown in FIG. 3, an artificial intelligence audio apparatus 100' may further include an image processor 180 that processes an image stored in the storage 150 and outputs the processed image to an external display apparatus 181 such as a monitor or a television (TV) by a control of the controller 200. In such case, the music data 153 stored in the storage 150 may include a plurality of videos corresponding to a plurality of music. The greeting data 151 and guiding data 156 may further include a plurality of greeting images and guiding images corresponding to a plurality of greeting voices or a plurality of greeting texts and guiding voices or guiding texts. Accordingly, when the greeting voice or greeting text, guiding voice or guiding text and music are output, the controller 200 may process corresponding greeting image, guiding image and video through the image processor 180, and output the processed images and video to the external display apparatus 181.

The second communicator 185 communicates with a counterpart communicator 191 of an illumination controller 190 which controls an internal illumination 250, by a control of the controller 200. The second communicator 185 may be connected to the counterpart communicator 191 of the illumination controller 190 in a wired manner through USB or mobile high-definition link (MHL), or wirelessly through Wi-Fi or Bluetooth.

The controller 200 may control overall operations of the artificial intelligence audio apparatus 100 and may include a central processing unit (CPU) and a RAM to execute firmware or OS as a control program stored in the storage 150.

The controller 200 may include a first control block 201 to determine an existence of a human through the human body detection sensor 114 of the sensing part 110 and say a greeting suitable for the current time and surrounding environment, a second control block 203 to ask whether to play music and upon request for music, to select and play a music suitable for the surrounding environment and mood, and a third control block 205 to adjust illumination and create a mood to be suitable for a type of a certain music if the certain music is played.

The first control block 201 collects weather information of the current location from the weather information server 211 based on location information of the current location sensed by the location sensor 111 of the sensing part 110. The first control block 201 controls the human body detection sensor 114 to sense an existence or non-existence of a human for every preset first time, e.g., for every three minutes. If the human body detection sensor 114 senses that there is a human in the current location, the first control block 201 determines whether it is time to output a predetermined greeting. If it is determined that it is time to output the predetermined greeting, the first control block 201 analyzes the current time sensed by the location sensor 111 of the sensing part 110, the temperature and humidity sensed by the temperature and humidity sensor 112, and the weather information of the current location collected from the weather information server 211, and extracts a greeting voice and greeting text from the greeting data 151 stored in Table 1 above, and outputs the extracted greeting voice and greeting text to the speaker and display unit 175 through the voice processor 160 and display processor 170, respectively. The timing for outputting the predetermined greeting may include timing when the artificial intelligence audio apparatus 100 is turned on, and respective timings whenever a predetermined second time, e.g., three hours elapse after the artificial intelligence audio apparatus 100 is turned on.

For example, if the current location is Yongin city (e.g., location information), current time is Mar. 7, 2013, 7 a.m. (e.g., time information), weather is clear, temperature is 15° C., humidity is 45% (e.g., weather information), and internal temperature is 25° C. (e.g., temperature information), the controller 200 may extract and output a greeting voice and greeting text "Good morning. On March 7, weather in Yongin city is clear, current temperature is 15° C., humidity 45%, and internal temperature 25° C. Good luck."

If it is sensed that there is no human in the current location, the first control block 201 further performs the operation of sensing the existence or non-existence of a human in the current location for every first time, e.g., for every three minutes, and for a predetermined frequency, e.g., three times more, and if it is determined that there is still no human, turns off the artificial intelligence audio apparatus 100.

It has been explained above that the first control block 201 outputs both the greeting voice and greeting text to the speaker and display unit 175 through the voice processor 160 and display processor 170, respectively. However, if a user sets to output only one of the greeting voice and greeting text through a setting window or screen executed and displayed by the ASIC part, the first control block 201 controls the voice processor 160 or the display processor 170 to output only a corresponding greeting voice or greeting text.

As shown in FIG. 3, if the artificial intelligence audio apparatus 100' further includes the image processor 180, the first control block 201 may process a greeting image corresponding to the greeting voice and greeting text through the image processor 180 and transmit the processed greeting image to the external display apparatus 181.

The second control block 203 may extract a guiding voice and guiding text from the guiding data 156 stored in the storage 150, may output the extracted guiding voice and guiding text to the speaker and display unit 175 through the voice processor 160 and display processor 170, respectively, and upon request from a user for playing music through the user input 140, may extract music suitable for the current time sensed by the location sensor 111 of the sensing part 110, the illumination (e.g., mood) sensed by the illumination sensor 113 of the sensing part 140 and the weather information provided by the weather information server 211, and may output the extracted music to the speaker through the voice processor 160.

Since the storage 150 stores therein music data 153 that is classified into folders according to the current time, weather, and mood (e.g., illumination) as in Table 2, or that has the tag information 155 according to the current time, weather, and mood (e.g., illumination) as shown in FIG. 2, the second control block 203 may easily extract music by using the current time, illumination (e.g., mood), and weather information.

As shown in FIG. 3, if the artificial intelligence audio apparatus 100' further includes the image processor 180, the second control block 203 may process a guiding image corresponding to the guiding voice and guiding text and a video corresponding to the music through the image processor 180, and output the processed guiding image and video to the external display apparatus 181.

If a user selects music through the user input 140 from a music execution window or screen (not shown) that is executed and displayed by the ASIC part and listens to the selected music, the third control block 205 generates an illumination control scenario through an illumination control scenario generator 230 to adjust brightness and color of an illumination 250 according to the music that is output through the voice processor 160, and transmits the generated illumination control scenario to the counterpart communicator 191 of the illumination controller 190 through the second communicator 185. The illumination control scenario generator 230 may generate the illumination control scenario through a generation algorithm. The illumination controller 190 controls the internal illumination 250 according to the illumination control scenario that has been received through the counterpart communicator 191.

The first to third control blocks 201, 203 and 205 may be implemented as the ASIC part that is designed to have greeting/music and selection/illumination control programs to perform functions thereof.

Figure 4:
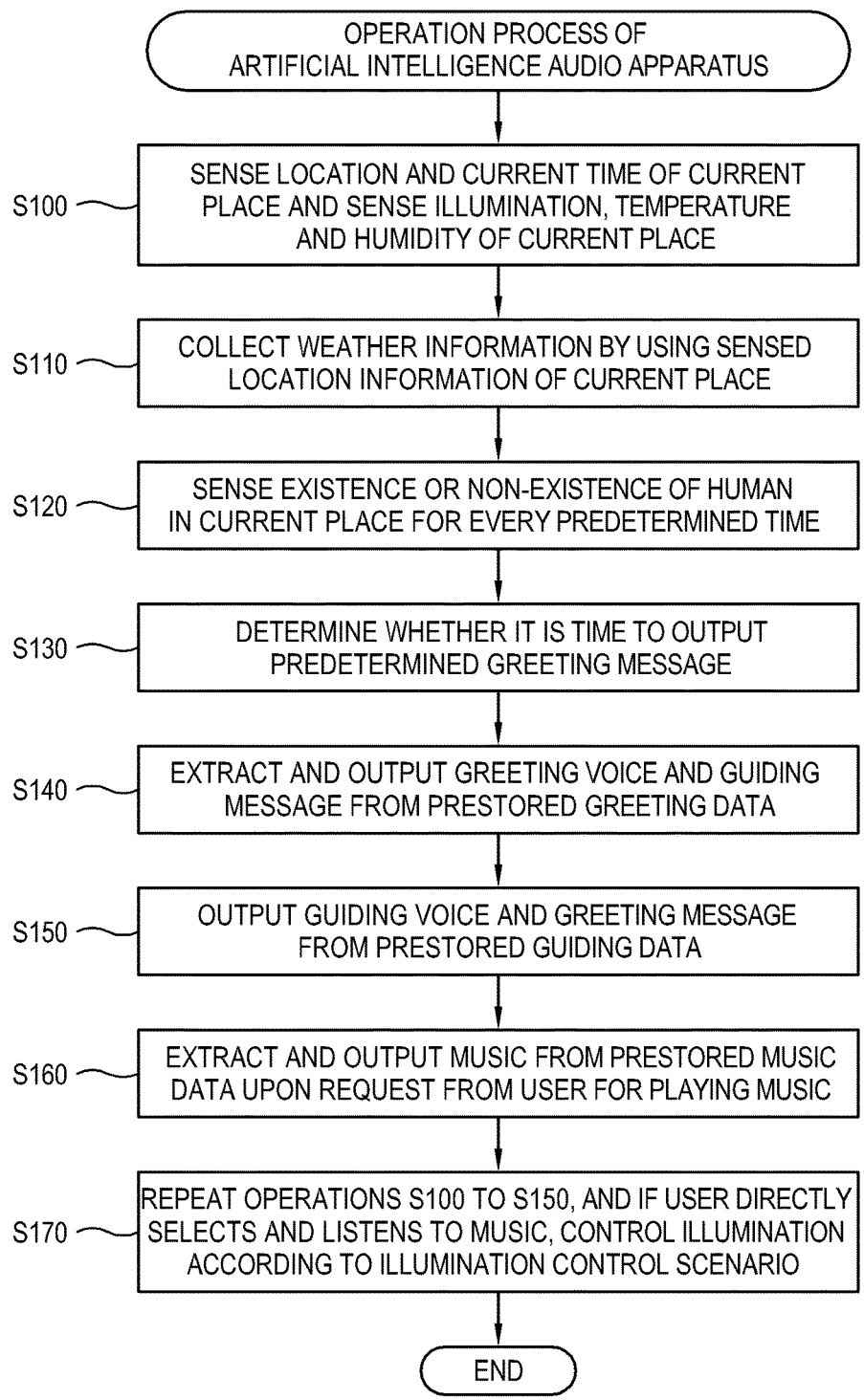
FIG. 4 is a flowchart showing operation processes of the artificial intelligence audio apparatus in FIG. 1.

Hereinafter, an operation method of the artificial intelligence audio apparatus 100 according to the embodiment will be described in detail with reference to FIG. 4.

The controller 200 controls the sensing part 110 to sense the current location and current time in a current place where the artificial intelligence audio apparatus 100 is located, and sense the temperature, humidity, and illumination of the current location (S100).

The controller 200 collects the weather information from the weather information server 211 through the network 101 based on the location information of the current place sensed by the sensing part 110 (S110). The weather information includes weather information including the date and time.

The controller 200 controls the sensing part 110 to sense the existence or non-existence of a human in the current place for every predetermined first time, e.g., for every three minutes (S120).

If it is sensed that there is a human in the current location at operation S120, the controller 200 determines whether it is time to output the predetermined greeting (S130). The timing for outputting the predetermined greeting may include the timing when the artificial intelligence audio apparatus 100 is turned on, and the respective timings whenever the predetermined second time, e.g., three hours elapse after the artificial intelligence audio apparatus 100 is turned on.

If it is determined at operation S130 that it is time to output the predetermined greeting, the controller 200 extracts the greeting voice and greeting text from the greeting data 151 stored in advance in the storage 150, corresponding to the greeting that is consistent with the current time sensed by the sensing part 110, the temperature and humidity of the current location sensed by the sensing part 110, and the weather information collected through the network 101, and outputs the extracted greeting voice and greeting text to the speaker and display unit 175 through the voice processor 160 and display processor 170, respectively (S140).

If a user sets to output only one of the greeting voice and greeting text through the setting screen executed and displayed by the ASIC part, the controller 200 controls the voice processor 160 or display processor 170 to output only the set greeting voice or greeting text.

The controller 200 outputs the guiding voice and guiding text extracted from the guiding data 156 stored in advance in the storage 150, to the speaker and display unit 175 through the voice processor 160 and display processor 170 (S150).

If a user sets to output only one of the guiding voice and guiding text through the setting screen executed and displayed by the ASIC part, the controller 200 controls the voice processor 160 or display processor 170 to output only the set guiding voice or guiding text.

If a user requests to play a music through the user input 140, the controller 200 extracts the music from the music data 153 stored in advance in the storage 150 that is consistent with the current time sensed by the sensing part 110, the illumination sensed by the sensing part 110, and the weather information collected through the network 101, and outputs the extracted music to the speaker through the voice processor 160 (S160).

Since the music data 153 are stored in the storage 150 by being classified into folders according to the current time and weather and illumination (e.g., mood) of the current location or by having the tag information 155 according to the current time and weather and illumination (e.g., mood) of the current location, the controller 200 may easily extract the music from the music data 153.

If the output of the extracted music is completed at operation S160, the controller 200 repeats the operations S100 to S160 until the artificial intelligence audio apparatus 100 is turned off by a user input through the user input 140.

If a user selects the music through the user input 140 from the music execution screen executed and displayed by the ASIC part and listens to the selected music after the operation S160, the controller 200 controls the internal illumination 250 according to the illumination control scenario of the music to be output (S170).

If it is determined at operation S120 that there is no human in the current location, the controller 200 further performs the operation of sensing the existence or non-existence of a human in the current location for every first time, e.g., for every three minutes and for the predetermined frequency, e.g., three times more, and if still no human is sensed, turns off the artificial intelligence audio apparatus 100. The artificial intelligence audio apparatus 100 may be turned off by gradually decreasing the volume of the music output through the speaker and by fading out the image displayed on the display unit 175.

As shown in FIG. 3, if the artificial intelligence audio apparatus 100' further includes the image processor 180, when the greeting voice and/or greeting text, guiding voice and/or guiding text and music are output, at operations S140, S150, and S160, the controller 200 may control the image processor 180 to further output the corresponding greeting image, guiding image, and video to the external display apparatus.

As explained above, the artificial intelligence audio apparatuses 100 and 100' and operation method thereof according to the embodiments may determine an existence or non-existence of a human to interact with the human, say greetings suitable for the current time and surrounding environment, ask whether to play music, and upon request for music, select and play music suitable for the current time, surrounding environment and mood, and adjust illumination according to the type of a certain music to create a mood when the certain music is played. As a result, a user may recognize the audio apparatus as an interacting apparatus, and may get rid of stress as well as having an emotional connection as if the user is interacting with another human.

Although a few exemplary embodiments have been shown and described, it will be appreciated by those skilled in the art that changes may be made in these exemplary embodiments without departing from the principles and spirit, the range of which is defined in the appended claims and their equivalents.

What is claimed is:

1. An artificial intelligence audio apparatus operable to provide a content service, comprising:
    a circumstance information obtaining device configured to obtain circumstance information comprising at least one of a location, a date, a current time, a temperature, a humidity, an existence of human, or an illumination, which is related with an surrounding environment;
    a first communication interface circuitry configured to communicate with an external server through a network;
    an audio output device configured to output an audio;
    a video output device configured to output a video;
    at least one memory operable to store program instructions; and
    at least one processor operable to read the stored program instructions;
    according to the stored program instructions, the at least one processor is configured:
        to collect reference information for the content service from the external server using the circumstance information obtained by the circumstance information obtaining device, and
        to output, via at least one of the audio output device or the video output device, the audio or the video of content service information comprising at least one of a greeting or a music, which corresponds to a current circumstance, based on the collected reference information.

2. The artificial intelligence audio apparatus according to claim 1,
    wherein the circumstance information obtaining device comprises a sensor part configured to sense a current location of the artificial intelligence audio apparatus and at least one of the temperature or a humidity of the current location, and sense whether a human exists in the current location, and
    wherein the sensor part comprises:
    a location sensor configured to sense the current location;
    a temperature and humidity sensor configured to sense the temperature and the humidity; and
    a human body detection sensor configured to sense whether the human exists in the current location.

3. The artificial intelligence audio apparatus according to claim 2, wherein the location sensor comprises a global positioning system (GPS) module.

4. The artificial intelligence audio apparatus according to claim 2, wherein the human body detection sensor comprises at least one of a passive infrared (PIR) sensor configured to sense infrared rays, and a camera configured to photograph an image.

5. The artificial intelligence audio apparatus according to claim 1, wherein the external server comprises a weather information server configured to provide the weather information which comprises the date and the current time.

6. The artificial intelligence audio apparatus according to claim 2, further comprising a non-transitory machine readable medium configured to store greeting texts according to a plurality of circumstances, and music data which comprises a plurality of music.

wherein the medium is further configured to store guiding data which comprises a guiding voice and a guiding text for inquiring whether to play the music.

7. The artificial intelligence audio apparatus according to claim 6, wherein the at least one processor is configured;

to collect weather information of the current location from the external server using location information of the current location sensed by a sensor part;

to determine whether a predetermined greeting should be output when the sensor part senses an existence of the human in the current location;

in response to determining that the predetermined greeting should be output, to extract at least one of a greeting voice or a greeting text, from greeting data stored in the medium, which corresponds with a current time, a least one of a temperature or a humidity sensed by the sensor part, and the weather information of the current location received from the external server; and to output the extracted at least one of the greeting voice or the greeting text through at least one of the audio output device or the video output device, wherein the at least one processor is further configured to extract at least one of the guiding voice or the guiding text from the guiding data stored in the medium, and output the extracted at least one of the guiding voice or the guiding text through the at least one of the audio output device or the video output device, and in response to a request for playing music, to select music from the music data stored in the medium which corresponds with the current time, the illumination sensed by the sensor part and the weather information received from the external server, and output the music through the audio output device.

8. The artificial intelligence audio apparatus according to claim 7, wherein the music data is stored in the medium and classified into folders according to time, weather, and the illumination.

9. The artificial intelligence audio apparatus according to claim 7, wherein the music data is stored in the medium and classified with tag information according to time, weather, and the illumination.

10. The artificial intelligence audio apparatus according to claim 7, wherein the at least one processor is further configured:

to process an image and output the processed image to an external display apparatus.

11. The artificial intelligence audio apparatus according to claim 10, wherein the at least one processor is further configured to output through an image processor a greeting image, a guiding image and a video corresponding to the greeting voice or the greeting text, the guiding voice or the guiding text and the music, respectively, in an output thereof.

12. The artificial intelligence audio apparatus according to claim 7, wherein a timing for outputting the predetermined greeting comprises a timing when the artificial intelligence audio apparatus is turned on and a plurality of timings which occur whenever a certain time elapses after the artificial intelligence audio apparatus is turned on.

13. The artificial intelligence audio apparatus according to claim 1, further comprising:

a second communicator circuitry configured to wirelessly communicate with an illumination controller that controls an internal illumination.

14. The artificial intelligence audio apparatus according to claim 13, wherein the at least one processor is further configured to transmit an illumination control scenario, which corresponds to music that is output through the audio output device, to the illumination controller through the second communicator circuitry to control the internal illumination according to the illumination control scenario in response to selecting and listening to the music.

15. An operation method of an artificial intelligence audio apparatus operable to provide a content service, the operation method comprising:

obtaining circumstance information comprising at least one of a location, a date, a current time, a temperature, a humidity, an existence of human, or an illumination, which is related with an surrounding environment;

collecting reference information for the content service through a network using the obtained circumstance information; and outputting an audio or a video of content service information comprising at least one of a greeting or a music, which corresponds to a current circumstance, based on the collected reference information.

16. The operation method according to claim 15, wherein the obtaining the circumstance information comprises collecting weather information through a network using location information of the sensed current location, and wherein the collecting the weather information comprises receiving a weather, a date and the current time.

17. The operation method according to claim 15, wherein the obtaining the circumstance information comprises sensing whether a human exists in the current location, and wherein the sensing whether the human exists comprises sensing whether the human exists for every predetermined first time.

18. The operation method according to claim 17, wherein the outputting further comprises determining whether it is time to output a predetermined greeting in response to determining that the human exist in the current location, and wherein the determining whether it is time to output the predetermined greeting comprises determining when the artificial intelligence audio apparatus is turned on and determining when a plurality of timings at a predetermined second time elapses after the artificial intelligence audio apparatus is turned on.

19. The operation method according to claim 15, wherein the obtaining the circumstance information comprises sensing a current location of the artificial intelligence audio apparatus and at least one of a temperature or a humidity of the current location, and wherein the sensing the temperature and the humidity of the current location further comprises sensing an illumination of the current location, and the outputting further comprises:
extracting and outputting at least one of a guiding voice or a guiding text from prestored guiding data; and
selecting and outputting music from prestored music data which corresponds with the current time, the sensed illumination, and the weather information received through the network in response to a request to play the music.

20. The operation method according to claim 19, wherein the music data is stored and classified into folders according to time, weather and the illumination.

21. The operation method according to claim 19, wherein the music data is stored with tag information according to time, weather, and the illumination.

22. The operation method according to claim 19, wherein the outputting further comprises outputting a greeting image, a guiding image and a video corresponding to the greeting voice or the greeting text, the guiding voice or the guiding text and the music, respectively, in an output thereof.

23. The operation method according to claim 15, further comprising:
controlling an internal illumination according to an illumination control scenario which corresponds to an output music in response to selecting and listening to the music.

24. An apparatus for controlling operations of an artificial intelligence audio apparatus operable to play music, comprising:
at least one memory operable to store program instructions; and
at least one processor operable to read the stored program instructions; according to the stored program instructions, the at least one processor is configured:
to determine whether a human exists in a current location of the artificial intelligence audio apparatus and output a greeting which corresponds with the current time and the current location of the artificial intelligence audio apparatus;
to inquire whether to play music corresponding to the current location, and select and play the music corresponding to the current location in response to a request to play music corresponding to the current location being input; and
to adjust an illumination corresponding to the music played.

25. The controller as claimed in claim 24, wherein the at least one processor is further configured to receive weather information of the current location of the artificial intelligence audio apparatus from a weather information server based on the current location of the artificial intelligence audio apparatus.

26. The controller as claimed in claim 24, wherein the at least one processor is further configured to determine whether the human exists every predetermined first time.

27. The controller as claimed in claim 24, wherein the at least one processor is further configured to extract a guiding voice and a guiding text from guiding data stored in a storage.

28. The controller as claimed in claim 24, wherein the at least one processor is further configured to generate an illumination control scenario to adjust brightness and color of the illumination according to the music played.

* * * * *